United States Patent [19]

Vry

[11] Patent Number: 4,615,025
[45] Date of Patent: Sep. 30, 1986

[54] DATA TRANSMISSION SYSTEM

[75] Inventor: Michael G. Vry, Tetbury, England

[73] Assignee: U.S. Philips Corporation, New York, N.Y.

[21] Appl. No.: 638,592

[22] Filed: Aug. 7, 1984

[30] Foreign Application Priority Data

Aug. 10, 1983 [GB] United Kingdom ............... 8321483

[51] Int. Cl.⁴ ...................... H04J 15/00; H04L 5/14; H04B 3/20; H04M 9/08
[52] U.S. Cl. .................................. 370/32; 179/170.2; 179/170.8; 375/12
[58] Field of Search ............ 370/32; 179/170.2, 170.8; 375/12, 14

[56] References Cited

U.S. PATENT DOCUMENTS

| | | | |
|---|---|---|---|
| 4,057,696 | 11/1977 | Gitlin et al. | 179/170.2 |
| 4,072,830 | 2/1978 | Gitlin et al. | 179/170.2 |
| 4,362,909 | 12/1982 | Snijders et al. | 179/170.2 |
| 4,375,692 | 3/1983 | Shensa et al. | 375/14 |
| 4,425,483 | 1/1984 | Lee et al. | 179/170.2 |
| 4,484,322 | 11/1984 | Fossati et al. | 370/32 |
| 4,531,220 | 7/1985 | Brie et al. | 375/14 |

*Primary Examiner*—Douglas W. Olms
*Assistant Examiner*—Wellinton Chin
*Attorney, Agent, or Firm*—Thomas A. Briody; William J. Streeter; Leroy Eason

[57] ABSTRACT

A data transmission system using a transmission code in which one data state corresponds to a zero transmission level, such as the alternate mark inversion (AMI) code, includes at each terminal adaptive signal processing circuits such as an echo canceller (402) and/or an adaptive equalizer (409). Each terminal includes a decision circuit (408) an output of which controls a switch (410) which is operative to allow updating of the adaption of the echo canceller (402) and adaptive equalizer (409) only when a data state corresponding to a zero transmission level is detected.

6 Claims, 4 Drawing Figures

Fig. 2.
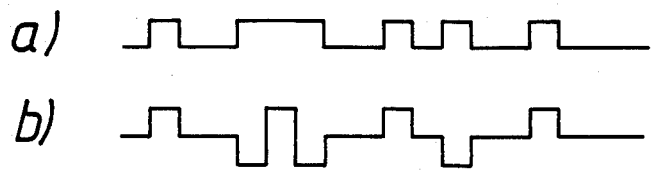
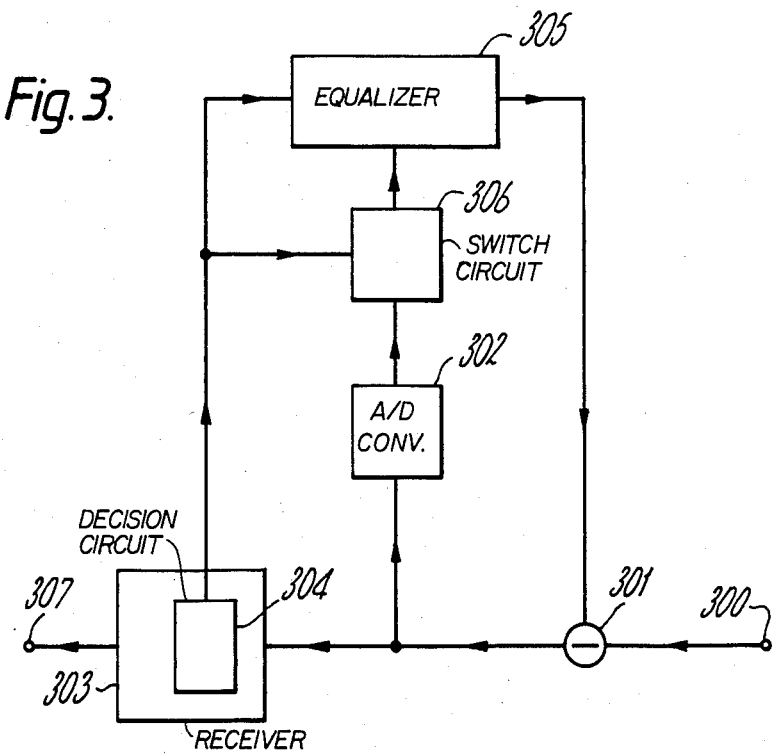
Fig. 3.

DATA TRANSMISSION SYSTEM

BACKGROUND OF THE INVENTION

1. Field of the Invention

The invention relates to a data transmission system using a transmission code in which one of the data states corresponds to a zero transmission level, the system including an adaptive signal processing circuit and means for detecting the data state represented by the received transmission code at fixed intervals.

2. Description of the Related Art

Digital data transmission systems for use in the local telephone network include signal processing circuits which are necessarily adaptive in order to cope with the wide range of line parameters encountered. Examples of such circuits are echo cancellers and feedback equalisers.

There are a number of different adaptation algorithms known at present. The simplest is to use special start-up sequences but this method is not often followed because of complications with the overall protocol and, in addition, the system cannot track changes which occur after initialisation. Instead, a number of known systems use some form of Least-Mean-Square algorithm whereby the coefficients are adjusted according to the gradient of the squared-error. Of course, once the residual echo becomes smaller than the received signal, then the error is not directly available. However, the correlation process used to determine the gradient of the square error also serves to extract the error from the total signal. This form of updating is termed the Zero Reference algorithm and is fully described by N. A. M. Verhoeckx, H. C. v. d. Elzen, W. A. M. Snijders and P. J. v. Gerwen in a paper entitled "Digital Echo Cancellation for Baseband Data Transmission" published in IEEE Transactions on Acoustics, Speech and Signal Processing, Vol. ASSP-27, No.6, December 1979, at pages 768–781. The disadvantage of this algorithm is the presence of the received signal. From the point of view of the echo-canceller, the received signal represents a large noise-like element which can only be removed by averaging over a large number of samples. This averaging leads to a long convergence time. In addition, the word-length of the coefficients has to be increased to accommodate the averaging process. Further, if a one-bit A/D converter is used then a dither signal, equal in amplitude to the received signal, has to be used as a reference for the converter to enable the error to be encoded.

To overcome this disadvantage, the Adaptive Reference algorithm has been developed. With this technique, which is described in a paper by D. D. Falconer entitled "Adaptive Reference Echo Canceller" published in IEEE Transactions on Communications", Vol. COM-30, No. 9, September 1982 at pages 2083–2094, a separate adaptive mechanism is used which learns to simulate the received signal. This is then subtracted from the total signal at the input to the echo-canceller leaving only the error signal to control the canceller. The disadvantage of this method is the further complication of the adaptive reference system.

SUMMARY OF THE INVENTION

It is an object of the invention to enable the provision of a data transmission system in which the effects of at least some of the disadvantages discussed hereinbefore are mitigated.

The invention provides a data transmission system as set forth in the opening paragraph characterised by means for updating the adaption of the signal processing circuit only when said one data state is detected.

If the signal processing circuit is updated only when the received signal is nominally at the zero transmission level there will be no interference from the received signal. Thus the advantages of the Adaptive Reference algorithm can be achieved without the accompanying increase in complexity by choosing a suitable transmission code and making use of the properties of that code. It should be noted that this technique can only be applied when the transmission code contains a zero level which is representative of a data state since the correction has to be made at instants corresponding to decision times. Thus codes such as the bipolar return to zero, in which the two binary states are represented by short positive and negative pulses, are not suitable since the correction needs to be made at times when the pulses occur.

BRIEF DESCRIPTION OF THE DRAWINGS

Embodiments of the invention will now be described, by way of example, with reference to the accompanying drawings, in which FIG. 2 illustrates the Alternate Mark Inversion transmission code, FIG. 3 shows in block schematic form a terminal, including an adaptive equaliser, for a transmission system according to the invention.

DESCRIPTION OF THE PREFERRED EMBODIMENTS

Figure 1:
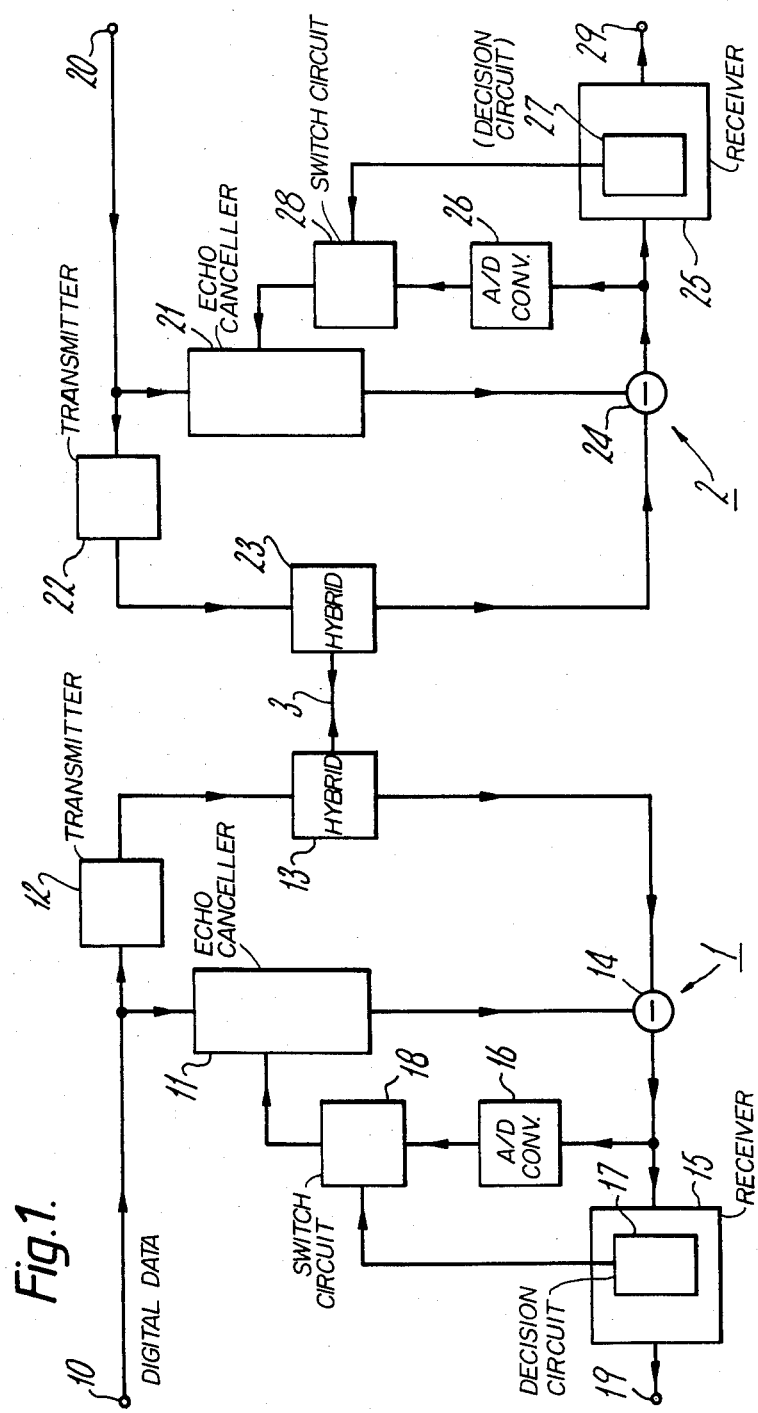
FIG. 1 shows in block schematic form a data transmission system according to the invention.

FIG. 1 shows a duplex data transmission system comprising a first data terminal 1 and a second data terminal 2 connected by a transmission link 3. The transmission link may take the form of a transmission line or may be a radio link.

The data terminal 1 comprises an input terminal 10 to which data to be transmitted is applied, the terminal 10 being connected to a first input of an echo canceller 11 and to the input of a data transmitter 12. The output of the transmitter 12 is connected to a first port of a hybrid circuit 13, a second port of which is connected to the transmission link 3. The third port of the hybrid circuit 13 is connected to a first input of a subtractor 14 whose other input is connected to the output of the echo canceller 11. The output of the subtractor 14 is connected to the input of a data receiver 15 and to the input of an analogue-to-digital converter 16. The data receiver 15 includes a decision circuit 17 an output of which is connected to the control input of a switch 18 which is connected between the output of the analogue-to-digital converter 16 and the control input of the echo canceller 11. An output terminal 19 of the data terminal 1 is connected to the output of the receiver 15 and provides a data output corresponding to the signal received over the transmission link 3.

The terminal 2, as far as features essential to the understanding of the invention are concerned, is identical to terminal 1 and the reference numerals denoting the various blocks in the terminal 2 correspond as far as the units digit is concerned to the equivalent blocks of terminal 1. In practice there are likely to be differences between the structures of the terminals 1 and 2 as for example one terminal may derive its clock information from the data transmitted by the other which contains the system master clock. This may be the case when for example one terminal is located at a telephone exchange the other is located at a subscriber's premises and the transmission link is the normal subscriber's line. However there differences will lie within the blocks 15 and 25 representing the receiver circuits. These circuits may be entirely conventional.

FIG. 2 shows binary data, FIG. 2a, together with the corresponding encoded version of the binary data, FIG. 2b, when the binary data is encoded to form the Alternate Mark Inversion (AMI) transmission code. In this code a logical "0" is transmitted as a zero level signal while a logical "1" is transmitted alternately as a positive and a negative level, these levels being held constant for each bit period. Thus on average over a long time the zero level will occur for 50% of the time.

In operation binary data is fed to input terminals 10 and 20 for simultaneous transmission by the terminals 1 and 2 in both directions along the transmission link 3. Initial separation between the output of the transmitter 12 and the input of the receiver 15 is provided by the hybrid circuit 13. However a significant proportion of the signal produced by the transmitter leaks across the hybrid circuit 13, both by direct coupling between the first and third ports and by reflections from discontinuities in the transmission link 3, to the input of the receiver 15. In order to reduce this interferring signal to an acceptable level a replica of this signal is produced by the echo canceller and subtracted from the received signal in the subtractor 14 before the received signal is passed to the input of the receiver 15 where it is decoded to produce the data output at terminal 19. The output of the subtractor is also fed to the analogue-to-digital converter 16 and applied to the control input of the echo canceller 11 to update the adaption of the echo canceller. Thus far the terminal 1 is conventional and essentially as described in the paper by Verhoeckx et. al. referred to hereinbefore, the contents of which are hereby incorporated by reference. However, by including a controllable switch 18 between the output of the digital-to-analogue converter 16 and the control input of the echo canceller and by using the output of the decision circuit 17 to control the switch 18 the system can be arranged to take advantage of a property of the AMI transmission code i.e. in one data state the received signal should be zero and that when this state is detected any signal level produced at the output of the subtractor 14 is due to the output of the transmitter 12 and hence should be used to further adapt the echo-canceller to improve the cancellation. This means that the noise like element of the received signal, as far as the echo-cancellation is concerned, caused by the signal transmitted from the far end terminal is eliminated. This is essentially the same result as achieved using the adaptive reference echo canceller disclosed in the paper by Falconer referred to hereinbefore but the result is achieved without the complexity of the reference former used by Falconer.

The updating of the echo canceller in the system as described is conditional on the current decision on the received data and it is assumed that this data originates from the far end transmitter, i.e. the transmitter 29 in the terminal 2. However, when the system is initially switched on and before the echo canceller has converged the current decision will be based on the local transmitter echo since this signal is likely to be of very much greater amplitude than any received signal from the remote transmitter. If the conditional updating arrangement is used on this signal the echo canceller will not converge since it will be prevented from learning about echo values which give a logical "1" at the output of the decision circuit. In fact the echo canceller will act as a feedback equaliser for the echo. This problem can be overcome by causing the switch 18 to be made regardless of the output state of the decision circuit for an initial period to allow the echo canceller to converge. Thus the conditional updating is inhibited for that period giving an unconditional updating. Unconditional updating for the initial period allows the initial convergence to be as fast as with the adaptive reference case and the conditional updating is really only required when the echo is smaller than the received signal i.e. when the echo canceller is close to convergence.

The determination of the initial period may be obtained in a number of ways, for example a fixed period could be generated which has a sufficient length to cover the worst case or the correlation between the data transmitted by the transmitter 12 and the output of the decision circuit 17 could be measured and the conditional updating enabled once the correlation begins to disappear.

FIG. 3 shows in block schematic form an adaptive equaliser 4 which comprises an input terminal 300 to which in operation the received signal is applied and which is connected to a first input of a subtractor 301. The output of the subtractor is connected to the input of an analogue-to-digital converter 302 and to the input of a receiver 303 which includes a decision circuit 304. The output of the decision circuit is connected to the input of an equaliser 305 and to the control input of a switching circuit 306. The output of the analogue-to-digital converter 302 is fed, via the switching circuit 306, to a control input of the equaliser 305, the output of the equaliser 305 being connected to a second input of the subtractor 301. The output of the receiver 303 which comprises a data output is connected to an output terminal 307.

As with the echo-canceller shown in and described with reference to FIG. 1 of the accompanying drawings the adaptive equaliser is updated only when a logic "0" is detected by the decision circuit 304 and hence only at instants when the received signal level due to the far end transmission is zero. This is achieved by using the output of the decision circuit 304 to control the switching circuit 306 so that the output of the analogue to digital converter 302 is applied to the control input of the equaliser 305 only when the decision circuit 304 detects a zero level transmission signal.

Figure 4:
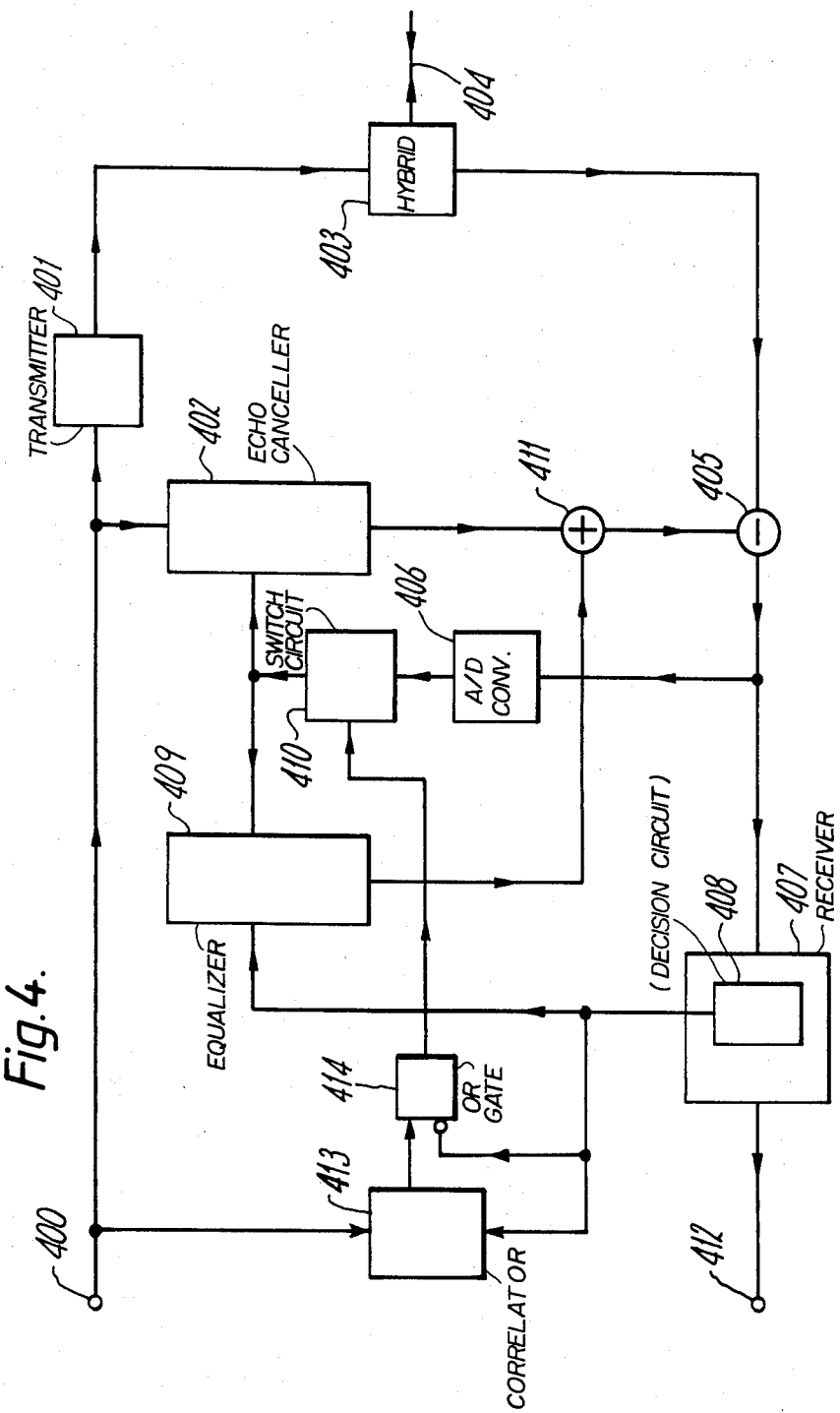
FIG. 4 shows in block schematic form a terminal, including an echo canceller and an adaptive equaliser, for a transmission system according to the invention.

FIG. 4 shows a data terminal for use in a digital data transmission system including both an echo canceller and an adaptive equaliser. The echo canceller is used to increase the suppression of the near end transmitter received by the receiver 407 while the adaptive equaliser reduces intersymbol interference.

The data terminal has an input terminal 400 to which digital data to be transmitted is applied. The terminal 400 is connected to the input of a transmitter 401 and to the input of an echo canceller 402 and to a first input of a correlator 413. The output of the transmitter 401 is connected to a first port of a hybrid circuit 403 whose second port is connected to a two way transmission link 404 along which signals are transmitted and received by the data terminal. The third port of the hybrid circuit 403 is connected to a first input of a subtractor 405 whose output is connected to the input of an analogue-to-digital converter 406 and to the input of a receiver 407 which includes a decision circuit 408. The output of the decision circuit 408 is connected to the input of an adaptive equaliser 409, to a second input of the correlator 413 and to a first inverting input of an OR gate 414. The output of the correlator is connected to a second input of the OR gate 414 and the output of the OR gate 414 is connected to a control input of a switching circuit 410. The output of the analogue-to-digital converter 406 is connected via the switching circuit 410 to control inputs of the echo canceller 402 and adaptive equaliser 409. The outputs of the echo canceller 402 and adaptive equaliser 409 are connected to first and second inputs of an adder 411, respectively, while the output of the adder 411 is connected to a second input of the subtractor 405. The output of the receiver 407 is connected to a terminal 412 at which the received decoded data signal becomes available.

As with the arrangements described with reference to FIGS. 1 and 3 the updating of the echo canceller and adaptive equaliser takes place only when the received data is detected as a logical "0", i.e. when the transmitted level from the far end is nominally at a zero level. Thus any received signal level indicates the presence of noise which should be cancelled. This may be as a result of leakage of near end transmitted data across the hybrid circuit 403, i.e. data transmitted by the transmitter 401, for which the echo canceller 402 is adapted to cancel or as a result of intersymbol interference due to the pulse response of the transmission link, including parts within the data terminals at each end of the transmission link, for which the adaptive equaliser is used. The outputs of the echo canceller and the adaptive equaliser subtract from the received signal to cancel the noise and cause the signal applied to the receiver 407 to more nearly approach that transmitted from the far end.

The correlator 413 checks for correlation between the signal transmitted from and that received by the terminal and produces a signal at its output to cause, via the OR gate 414, the switching circuit 410 to unconditionally connect the output of the analogue to digital converter 406 to the control inputs of the echo canceller 402 and adaptive equaliser 409 when correlation exists. This allows the adaptive circuits to initially converge when the near end signal is very much greater than the far end signal.

It should be noted that the echo canceller and hybrid circuit are only required for duplex transmission and can be omitted for transmission systems having separate send and receive paths which may be space, time or frequency separated. However for transmission systems with separate send and receive paths the use of an adaptive equaliser may still be advantageous in reducing intersymbol interference.

While the embodiments have been described with reference to the use of the AMI transmission code a transmission system according to the invention is not limited to the use of that code but may use any code in which a data state is represented by a zero level transmission. Other codes having this property include ternary codes and other multilevel codes where one level is a zero transmission level and may be representative of more than one data bit. It should therefore be noted that the term data state is not limited to one data bit but also includes a plurality of bits which may be defined by a single transmission level.

I claim:

1. A transmission system for digital data signals and which employs a transmission code in which one data state of such signals corresponds to a zero transmission level, comprising: an adaptive signal processing circuit which adapts to changes in the transmission characteristics of the system and updates such adaptation at fixed intervals; means for detecting the data states represented by received data signals; and means connected to said signal processing circuit and to said detecting means for inhibiting the updating of the adaptation of said signal processing circuit during intervals in which the transmission level of a received data signal does not correspond to said one data state.

2. A digital data transmission system as claimed in claim 1, in which the transmission code is the Alternate Mark Inversion code.

3. A transmission system as claimed in claim 1 or claim 2, in which the adaptive signal processing circuit comprises an adaptive equaliser.

4. A transmission system as claimed in any one of claim 1, 2, and 3, said system being a duplex transmission system, in which the adaptive signal processing circuit comprises an echo canceller, and further comprising means for disabling said inhibiting means for an initial period of transmission of a data signal.

5. A transmission system as claimed in claim 4, in which said means for detecting the data states of received data signals is a decision circuit, and said disabling means comprises circuit means for detecting correlation between a transmitted data signal and a received data signal detected by the decision circuit, said disabling means being adapted to produce a disabling signal for disabling said inhibiting means when such correlation is detected.

6. A method whereby the adaptation of a signal processing circuit to the transmission characteristics of a transmission system for digital data signals is updated at fixed intervals, comprising: encoding the signals into a transmission code in which one of the data states thereof corresponds to a zero transmission level; updating the adaptation of the signal processing circuit at fixed intervals to adapt to changes in the transmission characteristics of the system; detecting the data states represented by received data signals; and inhibiting the updating of the adaptation of the signal processing circuit during intervals in which the transmission level of a received data signal does not correspond to said one data state.

* * * * *